INVENTOR.
WILLIAM HANCOCK
BY
ATTORNEY

United States Patent Office 2,782,878
Patented Feb. 26, 1957

2,782,878
SPEED RESPONSIVE HYDRAULIC BRAKE
William Hancock, Knoxville, Iowa
Application March 27, 1952, Serial No. 278,867
3 Claims. (Cl. 188—183)

This invention relates in general to a braking means and in particular to apparatus for preventing a vehicle from running away.

It is often times desirable to have an auxiliary braking system on a moving vehicle, as for example a truck, which is useable in cases of emergency when the regular braking system fails.

It is an object of this invention, therefore, to provide a braking means which may be utilized on a moving vehicle to lessen the load on the normal brakes and to provide a safety device in case of failure of the normal brakes.

Another object of this invention is to provide an auxiliary braking system for a moving vehicle.

Still another object of this invention is to provide a braking mechanism which has no load or drag when disengaged.

A feature of this invention is found in the provision for a series of paddles rotatably connected to the drive shaft and partially immersed in a liquid so as to resist rotary motion.

Further, features, objects and advantages of this invention will become apparent from the folowing description and claims when read in view of the drawings, in which;

Figure 1:
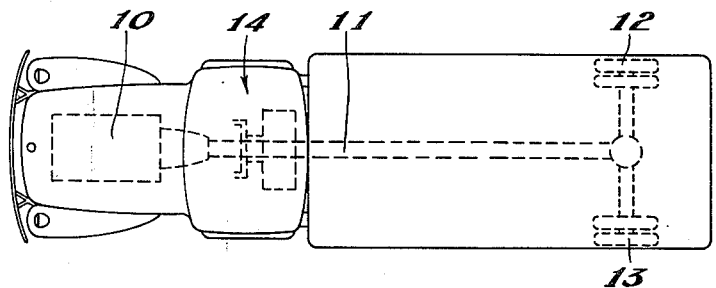
Figure 1 is a top view of a truck with the apparatus of this invention installed therein.

Figure 1 illustrates a motor vehicle, as for example a truck, which has an engine 10 that is connectible to the drive shaft 11 which transmits driving force to the rear wheels 12 and 13. The apparatus of this invention is designated generally as 14 and is shown in detail in Figure 2.

Figure 2:
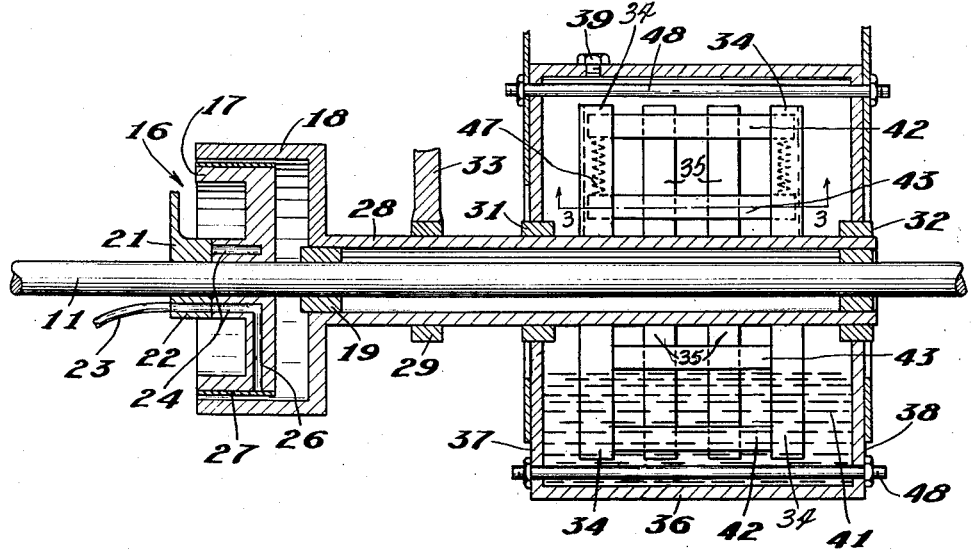
Figure 2 is a sectional view illustrating the apparatus of this invention.

As shown in Figure 2 the drive shaft 11 has mounted thereon a clutch 16 which comprises a clutch drum 17 rigidly attached to the drive shaft 11 and a clutch drum 18 rotatably supported by bearings 19 mounted on the drive shaft 11.

A collar 21 is rotatably supported on the shaft 11 adjacent the clutch drum 17 and is formed with an opening 22 to which is connected an oil supply line 23. The clutch drum 17 is formed with an annular groove 24 which has a passageway 26 which leads to a conventional friction clutching apparatus 27.

When oil pressure is connected to the tube 23 the clutching apparatus 27 is expanded to engage the clutch drum 18 to cause it to rotate with the drive shaft 11. The clutch drum 18 is connected to a hollow cylindrical member 28 which is mounted concentrically about the drive shaft 11 and is rotatably supported by bearings 29, 31 and 32.

The bearings 29 are connected to the truck chassis by suitable framing 33. A pair of outwardly extending paddles 34 and 35 extend from cylindrical member 28. The paddles 34 are offset from paddles 35 along member 28. Between paddles 34 are mounted a number of intermediate paddles 35 which have one of their ends attached to member 28. A drum or container 36 is rigidly connected to the truck chassis and has end plates 37 and 38 that fit concentrically about the cylindrical member 28 and support the bearings 31 and 32. The drum 36 fits about the paddles 34 and 35. A filler cap 39 is attached to the upper end of the drum 36 to allow oil or another liquid to be placed in the drum.

A transverse paddle 42 is mounted to the outer ends of each set of paddles 35 by welding or other suitable means. The ends of paddle 42 extend into slots 44 in outer paddles 34 and may be secured therein by welding or other suitable means. A second transverse paddle 43 is slidably carried by paddles 34. The paddles 34 may be hollow and are formed with slots 46 into which the paddles 43 extend. The ends 44 of paddles 43 cooperating with the slots 46 constitute a guide means for paddles 43 which slide along the surfaces of paddles 35. Springs 47 located within paddles 34 bias paddles 43 toward the center of the cylindrical member 28 and when the paddles are rotated by the engagement of the clutch 16, centrifugal force moves the paddles 43 outwardly until they are against the paddles 42.

Rods 48 hold the end plates 37 and 38 together and form baffle members to prevent the oil from flowing about the circumference of the drum.

Figure 3:
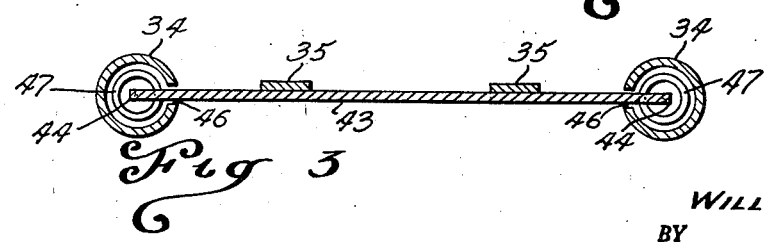
Fig. 3 is a sectional view taken along the lines 3—3 of Fig. 2.

Figure 3 is a detailed view which shows how the member 43 may be slidably mounted in the paddles 34.

In operation, if a truck is on a long downhill grade, as for example in mountains, the driver may actuate the clutch 16 by applying pressure to the line 23 and thus lock the drive shaft 11 to the cylindrical member 28 causing the paddles to rotate relative to the drum 36. The oil 41 will resist rotation of the paddles and will prevent the truck from traveling at excessive speeds. The governor action caused by the paddles 43 will regulate the resisting force in proportion to the speed. Thus, the conventional brakes may be conserved and in case of total failure the apparatus of this invention will maintain a safe speed.

The container 36 may be half filled.

Although this invention has been described with respect to a preferred embodiment it is not to be so limited, as changes and modifications may be made therein which are within the full intended scope of the invention as defined by the appended claims.

I claim:

1. Braking means for a motor vehicle comprising, a drive shaft rotatably suported by said vehicle, a cylindrical member rotatably supported concentric about said drive shaft, a clutch member between the drive shaft and cylindrical member to selectively impart rotation from the drive shaft to the cylindrical member, a container attached to the vehicle and concentric about the cylindrical member and rotatably engaged therewith, a plurality of groups of radially extending paddles attached to said cylindrical member within the container, fluid within said container, a first longitudinal paddle attached to each group of radially extending paddles, and a second longitudinal paddle connected to the radially extending paddles and slidable radially relative thereto, longitudinal slots formed in the outer of said radial paddles, guide means attached to both ends of said second longitudinal paddle, and said guide means received in said longitudinal slots.

2. Apparatus according to claim 1 wherein said second longitudinal paddles are spring biased towards the center of the cylindrical member and are forced outwardly by centrifugal force during rotation thereof.

3. A braking means for a vehicle comprising, a driven shaft rotatably supported by said vehicle, a cylindrical member concentric about said drive shaft and rotatably supported by the drive shaft, a container concentric about said cylindrical member and rotatably connected thereto, said container being rigidly attached to said vehicle, a plurality of groups of radially extending paddles attached to said cylindrical member, a longitudinal paddle attached transversely to each of the groups of radial paddles, clutch means between the driven shaft and cylindrical member for connecting them together, longitudinal slots formed in said radial paddles, a second plurality of longitudinal paddles, guide means attached to both ends of said each of said second longitudinal paddles and said guide means received in said longitudinal slots formed in the radial paddles.

References Cited in the file of this patent

UNITED STATES PATENTS

| | | |
|---|---|---|
| 671,324 | Powell | Apr. 2, 1901 |
| 713,637 | Henning | Nov. 18, 1902 |
| 1,173,877 | Severy | Feb. 29, 1916 |
| 1,224,669 | Rounds | May 1, 1917 |
| 1,830,564 | Rudquist | Nov. 3, 1931 |
| 2,440,445 | Jandasek | Apr. 27, 1948 |
| 2,445,573 | Godbe | July 20, 1948 |
| 2,627,165 | Fengler | Feb. 3, 1953 |

FOREIGN PATENTS

| | | |
|---|---|---|
| 26,548 | Great Britain | of 1910 |